Nov. 2, 1937.   J. ZAGORSKI   2,097,943
VALVE
Original Filed Nov. 25, 1931
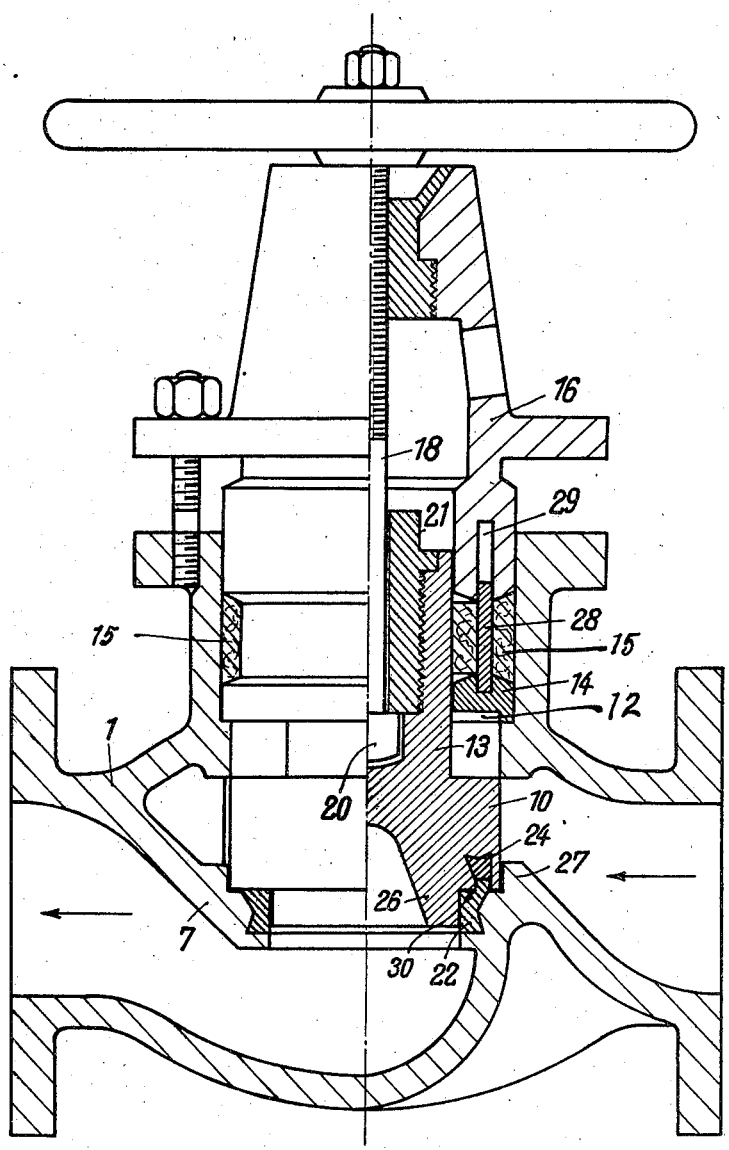
Inventor:
Johann Zagorski
by B. Singer
his Attorney Patented Nov. 2, 1937

2,097,943

UNITED STATES PATENT OFFICE 2,097,943

VALVE

Johann Zagorski, Berlin, Germany

Original application November 25, 1931, Serial No. 577,349. Divided and this application July 23, 1936, Serial No. 92,097. In Germany November 25, 1930

2 Claims. (Cl. 251—50)

This application is a division of application Serial No. 577,349 filed November 25, 1931.

The invention concerns valves which are especially adapted for handling steam or gaseous or liquid fluids under high pressure and high temperatures and for conserving absolute tightness. even when constructed with large dimensions and when subjected to severe conditions of use.

The valve has as its essential feature a circular closing member joined to a piston of smaller diameter than said member, and said piston is sealed in the valve casing by a stuffing box, covering the annular space between said piston and the wall of said casing, by a base ring exposed to its largest extent to the interior of the valve. By this construction the valve is so balanced as to be able to be opened and closed with relatively small forces and ample velocity even in large sizes, and the movable member can be placed in position and dismantled for making the valve seats accessible in very simple manner, due to the large opening of the valve casing closed by the corresponding large packing. Thus looseness is diminished as no separate valve body head flange needs to be tightened. Very high temperatures (500 degrees Celsius) can be sustained by this new valve as the packing yields so far as the casing is deformed by heat, so that the seats remain tight.

A sleeve subdividing the packing into two coaxial cylinders provides a special adaptation of the packing for large diameter differences between the closing member and piston.

In valves having a longitudinally perforated piston the invention uses a second stuffing box for packing the valve operating spindle in a closing head of the casing, and with advantage said closing head is identical with the closure member of the first stuffing box. Also in this case the interior of the valve remains easily accessible for repairs and both stuffing boxes can be tightened from the outside.

One embodiment of the invention is shown in the drawing in which

The figure is a section of a valve having a solid piston.

The movable member of the valve consists of a seating piston 10 made in one piece with a balancing piston 13 of smaller diameter than the seating piston, so as to form a differential piston. In the example shown, the area of the cross section of the balancing piston 13 covers nearly one-half of the entire area of the seating piston 10. Therefore, when the valve is closed, the fluid acts only on the half area of the seating piston 10. On the other hand, when the valve is opened, the fluid acts from below on the total area of the piston 10 and from above only on its annular portion projecting beyond the periphery of the piston 13, so that again half the axial force acting on the piston is balanced. The larger the piston 13 is, the larger is the percentage of balancing in case of opening the valve and the smaller in case of closing the valve, and inversely.

For tightening said balancing piston, a stuffing box is provided in the valve body 1, consisting of a base ring 14, a packing 15 of asbestos or other compressible material, and a valve body head 16.

The packing 15 must be tight so that the pressure of the fluid cannot go over the piston 13. In this way, upon opening of the piston 13, there is no load applied on the piston from above through the pressure of the fluid, but only upon the rim of the piston 10 projecting beyond the piston 13. The surface of this projecting rim of the piston 10 is about half as great as the total cross-section of the piston 10, and the differential piston 10, 13 is accordingly relieved of load to about 50% upon opening.

If the valve is opened, the piston 10 is completely under load from below by the medium; from above, on the contrary, only about one-half, namely, only up to the side walls of the piston 13. In view of this the differential piston 10, 13 is again relieved of load to about 50%. The condition for this method of operation is, of course, that the flow of the medium takes place only from above. The base ring 14 is exposed on its lower side to the fluid pressure so as to be automatically pressed against the packing thereby to tighten the latter. The seating piston 10 is so long that in full open position of the valve it presses against said base ring 14 for attaining absolute tightness of the packing, the base ring having a recess 12 on its under face to receive the valve member 10 (seating piston) when the valve is opened fully. The valve body head 16 contains a screw nut and a threaded spindle 18 with a hand wheel for moving the differential piston 10, 13, said spindle 18 ending in a collar 20 loosely enclosed in said piston 13 by aid of a sleeve 21 screwed into said piston. Said loose connection makes the piston free from the rotation and the guiding effect of the spindle, so that it moves only axially and without jamming in the stuffing box.

In the stuffing box, a sleeve 28 is fastened in the base ring 14 and extends into an annular slot 29 in the valve body head 16 for subdividing the packing which has a rather large radial dimension corresponding to the difference of the diameters of the differential piston 10, 13. This ensures additional tightness as well on the piston 13 as on the valve body 1.

The seats of the valve consist of a hard steel ring 22, inserted in the valve diaphragm 7, and of a plastic metal seat ring 24 embedded in an undercut groove of the seat piston 10. Projections 27 and 30 on the diaphragm and seat piston respectively serve as bodies protecting the seats against erosion by the streaming fluid.

I claim:

1. A valve comprising a valve body, a diaphragm in said body, provided with a circular passage, an annular seat on top of said passage, a movable valve member of completely closed cross section for engaging said seat and closing said passage, a reciprocable piston of smaller diameter than the smallest periphery of said seat, forming part of said valve member, a hollow cylindrical valve body portion about said piston arranged concentrically to the diaphragm passage and having a sufficiently large internal diameter to allow the introduction of said valve member into said valve body, and a stuffing box in the annular space between said piston and said cylindrical valve body portion and comprising a reciprocably mounted base ring exposed to the interior of the valve body over essentially the entire annular area included between the adjacent circumferences of said cylindrical valve body portion and said piston and packing in said annular space above said base ring.

2. In a valve, a valve body having an inlet and an outlet and a diaphragm between said inlet and outlet, said diaphragm having a circular passage, an annular seat at the top of said passage, a movable valve member closed as to cross-section for engaging said seat and closing said passage, said valve body having a neck with a passage of a diameter slightly greater than the outside diameter of said movable valve member which passage has a counter bore, a piston reciprocable in said counter bore and being of smaller diameter than the smallest diameter of said circular passage, said piston forming part of said valve member, a valve body head having a portion located in said counter bore, a base ring reciprocably mounted in said counter bore and cooperating with said head portion to form a stuffing box about said piston, packing in said stuffing box, said base ring having a recess on its under face to receive said movable valve member when the valve is opened fully, said base ring and said head portion having opposed annular grooves, and a sleeve located in said grooves substantially as shown and described.

JOHANN ZAGORSKI.